US011917090B2

(12) United States Patent
Juntilla

(10) Patent No.: US 11,917,090 B2
(45) Date of Patent: Feb. 27, 2024

(54) METHODS AND SYSTEMS FOR TRACKING OWNERSHIP OF GOODS WITH A BLOCKCHAIN

(71) Applicant: Nicholas Juntilla, Santa Monica, CA (US)

(72) Inventor: Nicholas Juntilla, Santa Monica, CA (US)

( * ) Notice: Subject to any disclaimer, the term of this patent is extended or adjusted under 35 U.S.C. 154(b) by 98 days.

(21) Appl. No.: 16/669,962

(22) Filed: Oct. 31, 2019

(65) Prior Publication Data

US 2021/0135888 A1    May 6, 2021

(51) Int. Cl.
| | |
|---|---|
| H04L 29/06 | (2006.01) |
| H04L 9/32 | (2006.01) |
| G06Q 20/38 | (2012.01) |
| G06Q 20/06 | (2012.01) |
| H04L 9/00 | (2022.01) |

(52) U.S. Cl.
CPC ......... *H04L 9/3297* (2013.01); *G06Q 20/065* (2013.01); *G06Q 20/3825* (2013.01); *H04L 9/3236* (2013.01); *H04L 9/50* (2022.05); *H04L 2209/56* (2013.01)

(58) Field of Classification Search
CPC . H04L 9/3297; H04L 9/3236; H04L 2209/56; H04L 2209/38; H04L 9/3239; H04L 63/00; G06Q 20/3825; G06Q 20/065
See application file for complete search history.

(56) References Cited

U.S. PATENT DOCUMENTS

| | | | | |
|---|---|---|---|---|
| 2015/0341462 | A1* | 11/2015 | DuBois | H04L 67/5681 709/217 |
| 2017/0046806 | A1* | 2/2017 | Haldenby | G06Q 40/08 |
| 2017/0178072 | A1* | 6/2017 | Poornachandran | G06Q 20/3829 |
| 2017/0232300 | A1* | 8/2017 | Tran | A63B 71/06 434/247 |
| 2017/0300627 | A1* | 10/2017 | Giordano | G06F 21/6245 |
| 2018/0039942 | A1* | 2/2018 | Rogers | G06Q 10/101 |
| 2018/0294957 | A1* | 10/2018 | O'Brien | H04L 9/0643 |
| 2018/0343114 | A1* | 11/2018 | Ben-Ari | H04L 9/06 |
| 2019/0052454 | A1* | 2/2019 | Wright | G06Q 20/36 |
| 2019/0130484 | A1* | 5/2019 | de Jong | G06Q 20/401 |
| 2019/0205894 | A1* | 7/2019 | Gonzales, Jr. | H04L 9/30 |
| 2019/0287195 | A1* | 9/2019 | Lee | G06Q 40/04 |
| 2019/0372772 | A1* | 12/2019 | Novotny | H04L 9/3239 |

(Continued)

*Primary Examiner* — Taghi T Arani
*Assistant Examiner* — Lin Chang

(57) ABSTRACT

In one aspect, a computerized method for digitally tracking ownership of goods with a blockchain includes the steps of providing a blockchain. The blockchain includes a set of blockchain ownership records provided in a chronological mathematical proof format such that specified data exists in a specific chronological order. The method includes the step of saving a smart contract that references a real-world object in the blockchain. The smart contract includes a tool for tracking ownership of the real-world object. With a computer application, the method enables an owner of the real-world object to modify an owner data portion of the smart contract to a new owner entity to change the ownership of the real-world object in the blockchain. The method includes the step of updating the owner data portion of the smart contract in the blockchain to include the new owner entity.

6 Claims, 11 Drawing Sheets

(56) References Cited

U.S. PATENT DOCUMENTS

2021/0091960 A1\* 3/2021 Werner .................... H04L 9/50
2021/0192473 A1\* 6/2021 Meehan ................ H04L 9/3239

\* cited by examiner

```
event History(address indexed _receiptId, address _newOwner);

struct Receipt {
    uint256 id;
    uint created;
    address owner;
    address holder;
    bytes32 name;
    uint256 location;
    bytes32 description;
    uint256 mediaLinks;
}
mapping (uint256 => Receipt) public receipts;

function addReceipt(
    uint256 _id,
    address _owner,
    address _holder,
    bytes32 _name,
    uint256 _location,
    bytes32 _description,
    uint256 _mediaLinks ) public {
    var newReceipt = Receipt(_id, _owner, _holder, _name, _location, _description, _mediaLinks);
    receipts[_id] = newReceipt;
} function changeOwner(uint256 _receiptId, address _newOwner)
public
{
  require(msg.sender == receipts[_receiptId].owner);
  emit History(_receiptId, _newOwner);
  receipts[_receiptId].owner = _newOwner;
}
```

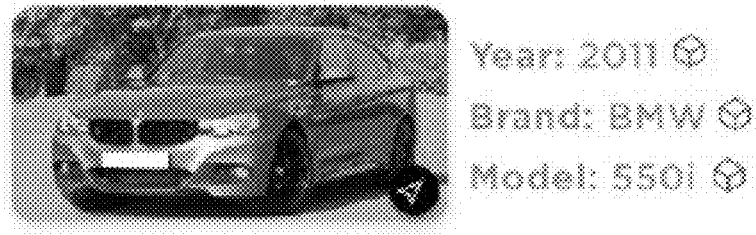
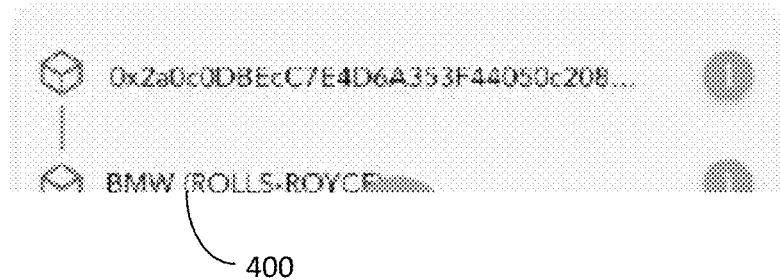
FIGURE 4

```
contract OwnershipRecordContract { event Record(bytes62 indexed id, bytes62 sig, string data);

function addRecord(bytes62 _id, bytes62 _sig, string _data) public {
        Record(_id, _sig, _data);
    }
}
```

This "addRecord" method might be called with these parameters:
(
"76F81B1EA467C25842D9E92B91BD1A18D51665ADCC7AF65255655097C0AB58DB",
"0x95618ae6abfeb614e80bdf55fe082c4b6f65480b99222cf6baf65d08bba4d5510fa77b496ed847ad6c2d46ba2168
7588167099e4a6ce91b0b1bf2c467c9bbd691c",
"owner:'0xE94F5a900794676fa9B1140d9dD6767d0219b99f',holder:'0xE94F5a900794676fa9B1140d9dD67
67d0219b99f',name:'2018 Honda',location:'40.741895,-76.989608'"
)

```
event NewOwner(bytes32 indexed _receiptId, address _newOwner);
event NewData(bytes32 indexed _receiptId, address _newData);

struct Receipt {
    address owner;
    string data;
}
mapping (bytes32 => Receipt) public receipts;

function addReceipt(
     bytes32 _id,
     address _owner,
     data _string

) public {
    var newReceipt = Receipt(_id, _owner, _string);
    receipts[_id] = newReceipt;
  } function changeOwner(bytes32 _receiptId, address _newOwner)
   public
   {
    require(msg.sender == receipts[_receiptId].owner);
    emit NewOwner(_receiptId, _newOwner);
    receipts[_receiptId].owner = _newOwner;
   } function changeData(bytes32 _receiptId, string _newData)
   public
   {
    require(msg.sender == receipts[_receiptId].owner);
    emit NewData(_receiptId, _newData);
    receipts[_receiptId].data = _newData;
   }
```

METHODS AND SYSTEMS FOR TRACKING OWNERSHIP OF GOODS WITH A BLOCKCHAIN

CROSS-REFERENCE TO RELATED APPLICATIONS

This application claims priority from U.S. provisional patent application No. 62/694,603, titled METHODS AND SYSTEMS FOR TRACKING OWNERSHIP OF GOODS WITH A BLOCKCHAIN and filed on 6 Jul. 2018. This application is hereby incorporated by reference in its entirety.

This application claims priority from U.S. patent application Ser. No. 16/504,317, titled METHODS AND SYSTEMS FOR TRACKING OWNERSHIP OF GOODS WITH A BLOCKCHAIN and filed on 7 Jul. 2019. This application is hereby incorporated by reference in its entirety.

BACKGROUND

Blockchains have enabled the authentication of various products. Accordingly, improvements to tracking ownership of goods with a blockchain are desired.

BRIEF SUMMARY OF THE INVENTION

In one aspect, a computerized method for digitally tracking ownership of goods with a blockchain includes the steps of providing a blockchain. The blockchain includes a set of blockchain ownership records provided in a chronological mathematical proof format such that specified data exists in a specific chronological order. The method includes the step of saving a smart contract that references a real-world object in the blockchain. The smart contract includes a tool for tracking ownership of the real-world object. With a computer application, the method enables an owner of the real-world object to modify an owner data portion of the smart contract to a new owner entity to change the ownership of the real-world object in the blockchain. The method includes the step of updating the owner data portion of the smart contract in the blockchain to include the new owner entity.

BRIEF DESCRIPTION OF THE DRAWINGS

The present application can be best understood by reference to the following description taken in conjunction with the accompanying figures, in which like parts may be referred to by like numerals.

FIG. 3 illustrates an example screen shot of pseudo-code useful for tracking ownership of goods with a blockchain, according to some embodiments.

FIG. 4 illustrates an example screen shot of good with ownership tracked with a blockchain, according to some embodiments.

FIG. 7 illustrates an example screenshot of pseudocode useful for the improvement of data storage on a blockchain using an event log, according to some embodiments.

FIG. 8 illustrates an example screenshot of pseudocode useful for improving the combine best traits the various processes provided herein, according to some embodiments.

Figure 1:
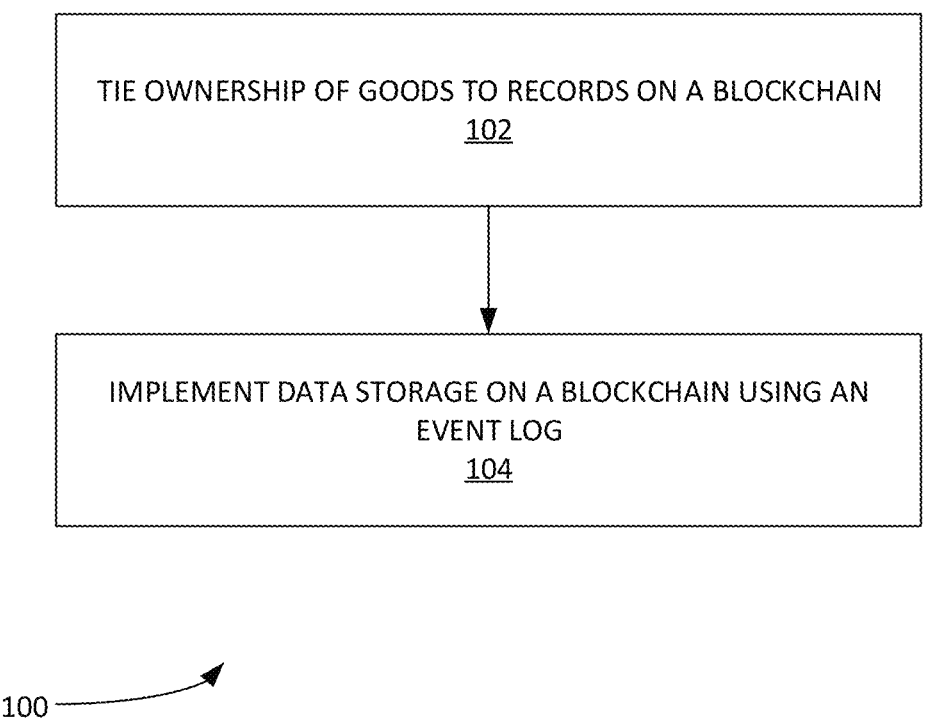
FIG. 1 illustrates an example process for tracking ownership of goods with a blockchain, according to some embodiments.

The Figures described above are a representative set and are not an exhaustive with respect to embodying the invention.

DESCRIPTION

Disclosed are a system, method, and article of manufacture for tracking ownership of goods with a blockchain. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to "one embodiment," "an embodiment," "one example," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Blockchain can be a continuously growing list of records (e.g. blocks), which are linked and secured using cryptography. Each block typically contains a cryptographic hash of the previous block, a timestamp, and transaction data.

Ethereum is an open-source, public, blockchain-based distributed computing platform and operating system featuring smart contract (scripting) functionality.

Hashing is a method of cryptography that converts any form of data into a unique string of text. Any piece of data can be hashed, no matter its size or type. It is noted that, regardless of the data's size, type, or length, the hash that any data produces is always the same length. A hash is designed to act as a one-way function, a system can put data into a hashing algorithm and obtain a unique string. A unique piece of data will always produce the same hash.

JavaScript Object Notation or JSON is an open-standard file format that uses human-readable text to transmit data objects consisting of attribute-value pairs and array data types (or any other serializable value).

Matrix code can be a 2D barcode and is a two-dimensional way to represent information. It noted that a linear (e.g. one one-dimensional) barcode can be utilized as well.

NoSQL database provides a mechanism for storage and retrieval of data that is modeled in means other than the tabular relations used in relational databases.

QUICK RESPONSE CODE™ (QR) is a type of matrix barcode (e.g. a two-dimensional barcode).

Example Systems and Methods

FIG. 1 illustrates an example process 100 for tracking ownership of goods with a blockchain, according to some embodiments. In step 102, process 100 can tie the ownership of goods to records on the blockchain. In step 104, process 100 can provide for an improvement of data storage on a blockchain using an event log.

Figure 2:
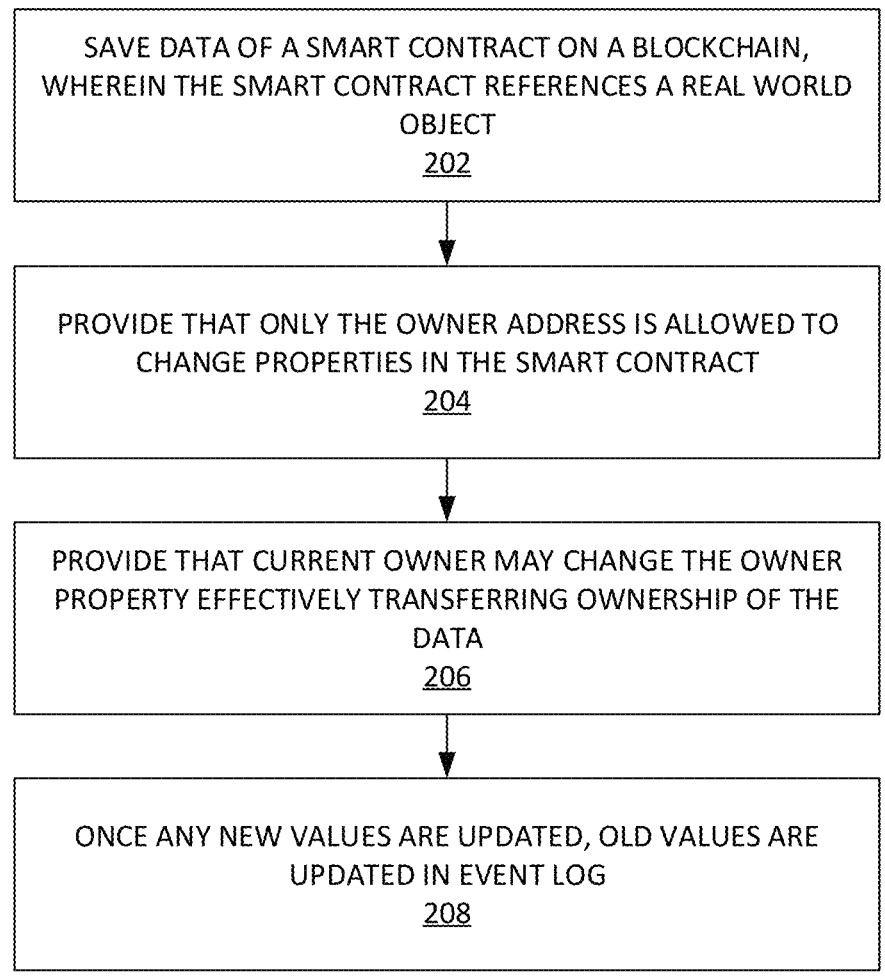
FIG. 2 illustrates another example process for tracking ownership of goods with a blockchain, according to some embodiments.

FIG. 2 illustrates another example process 200 for tracking ownership of goods with a blockchain, according to some embodiments. In step 202, process 200 saves data on the blockchain in a smart contract that references a real-world object. The smart contract can act as a tool for keeping track of object ownership. Examples of that data saved in the smart contract include, inter alia: identifier(s), owner data, address data, holder data, name data, location data, and/or description data. The identifier of the data is a hash of some media (e.g. an image and/or video file).

It is noted that blockchain ownership records provide chronological mathematical proof that certain data exist in a specific chronological order. Adding a descriptions of physical items to data such as hash of a photograph indicates that data existed in a specific chronological order. In this way, the history of an item can be built up over time and the history can be used to verify the origin. Blockchains can use private and public key technology. Records can be owned by keypairs and may only be transferred and updated by holders of those keypairs. This ensures a record passed through specific entity like an official brand (e.g. Nike®, etc.) and ensures authenticity an item.

In step 204, it is provided by process 200 that only the owner address is allowed to change properties in the smart contract. The owner is the person who holds the private key of the address. The address is a number (e.g. a public key, etc.). The public key can be used to assign an item to a user.

It is noted that the owner in process 200 can refer to the holder of the private key that corresponds to the public key. Each public key has a corresponding private key. Only the owner of the private key can change the data in the smart contract (e.g. on the blockchain). Process 200 can utilize an application to hold the private keys for each user so that the user can conveniently make transactions through the application. The mechanism for limiting who can change data on a smart contract is built into blockchain and smart contract technology. For example, a smart contract can be written where anyone can change the data, but in this case only the private key owner who is listed as 'owner' in the smart contract can change the data. Process 200 can provide smart contracts built to only respond to certain private keys. Additionally, the smart contracts can be done specifically with data relating to physical items. The application can be used with physical items for example having an owner field, type, location etc.

In step 206, it is provided by process 200 that the current owner may change the owner property effectively transferring ownership of the data. In step 208, once any new values are updated, the old values are updated in the event log by process 200.

FIG. 3 illustrates an example screen shot 300 of pseudo-code useful for tracking ownership of goods with a blockchain, according to some embodiments. FIG. 4 illustrates an example screen shot of good with ownership tracked with a blockchain, according to some embodiments.

Figure 5:
FIG. 5 illustrates an example matrix code, according to some embodiments.

FIG. 5 illustrates an example matrix code, according to some embodiments. The matrix code can be a QR code. In one example, to find out more information about an item a QR code is generated by the system as demonstrated in FIG. 5, according to some embodiments. A user can scan the QR code to fetch history information about the item. This can be done in the application or on a public website. This information can include, inter alia: include ownership history, details about the item, links to relative websites, and the ability to contact the owner. An example of that information is shown in FIG. 4 supra. An obfuscated user ID and/or real name may be shown in the owner history. The ownership chain of an item may be used to identify authenticity. Genuine products can originate with the maker of those products as well.

Figure 6:
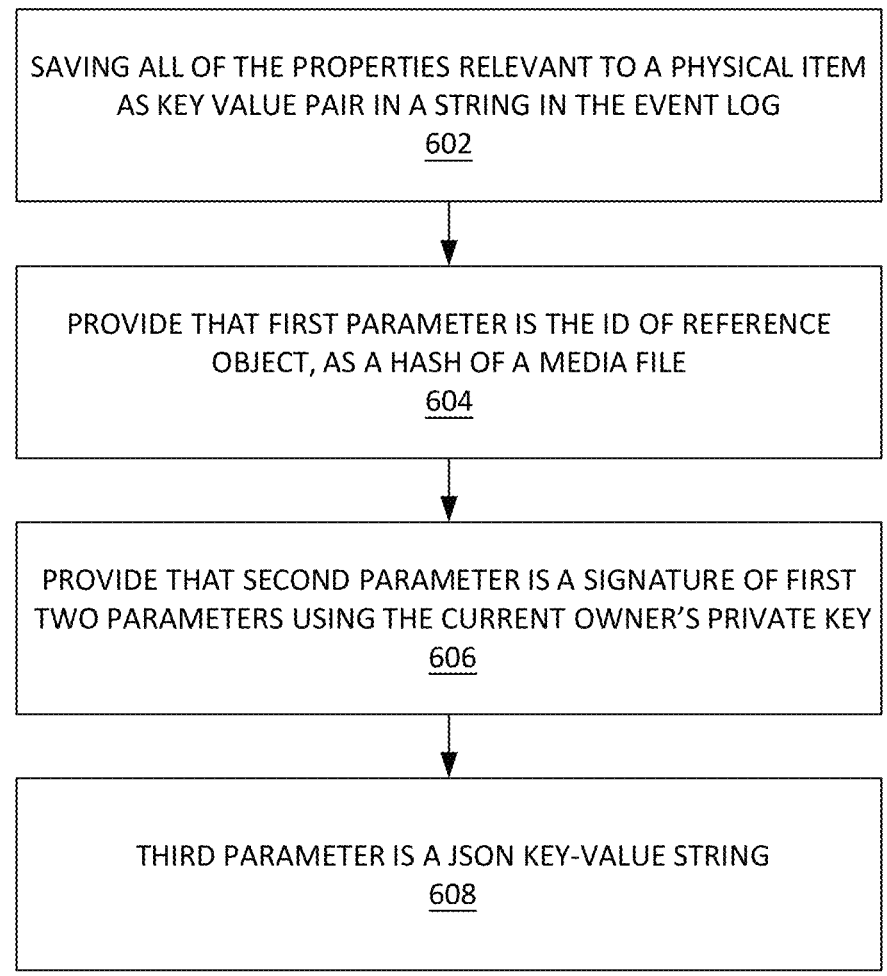
FIG. 6 illustrates an example process for improvement of data storage on a blockchain using an event log, according to some embodiments.

FIG. 6 illustrates an example process 600 for improvement of data storage on a blockchain using an event log, according to some embodiments. In order to save on ETHEREUM gas fees while saving data to the blockchain process 600 can save the relevant data in a more efficient way. In step 602, process 600 can save all of the properties relevant to a physical item as key value pair in a string in the event log. This is a more compact way of saving the same data shown in the first example. Instead of parameters being separated out, each having their own memory space. Process 600 can gather key-value pairs into one variable that we save on to the blockchain. In order to keep track of who is allowed to add new properties to an item we can sign this data with the caller's private key. Using this method one function can be used to replace all the variables in the first example. In step 604, process 600 can provide that the first parameter is the ID of the reference object is a hash of a media file. In step 606, process 600 can provided that the second parameter is a signature of the first two parameters using the current owner's private key. In step 608, process 600 can provide that the third parameter is a JSON key-value string.

It is noted that Using this method we can call one function to add an arbitrary number of parameters to the blockchain. Process 600 can provide three major benefits including, inter alia, the following. The gas fees to write the ETHEREUM event log can be less than using smart contract storage space. Provide 600 can add new key-value pairs to our smart contract after it has been deployed because the keys are defined in the string rather than the smart contract. When saving string data in a string, process 600 can use the JSON format to create nested key-value pairs and arrays. This data can be parsed and inserted into a NoSQL style databases. When parsing this data, the reading application can check signatures and validate if the current owner is adding properties. The properties can be read from the event log later with the most current valid keys replacing older valid keys. After reading the entire event log the current value keyset be identified relating to in ID.

FIG. 7 illustrates an example screenshot of pseudocode 700 useful for the improvement of data storage on a blockchain using an event log, according to some embodiments.

FIG. 8 illustrates an example screenshot of pseudocode 800 useful for improving the combine best traits the various processes provided herein, according to some embodiments. The item identity files to store files can be structured in such a way that all the variable data is stored in a string in the smart contract storage, but still protected by being updated by an authorization function. In this example, the current data is accessible in the current contract storage as a string that stores JSON data. This can more efficient than saving individual properties. The history of data changes is saved in the event log. Having the entire blockchain is not necessary in order to see the current properties of an item and some gas is saved by storing it in string format. The method of FIG. 8 can be used on a private blockchain to decrease the fees more and then save periodic updates on the main chain.

Figure 9:
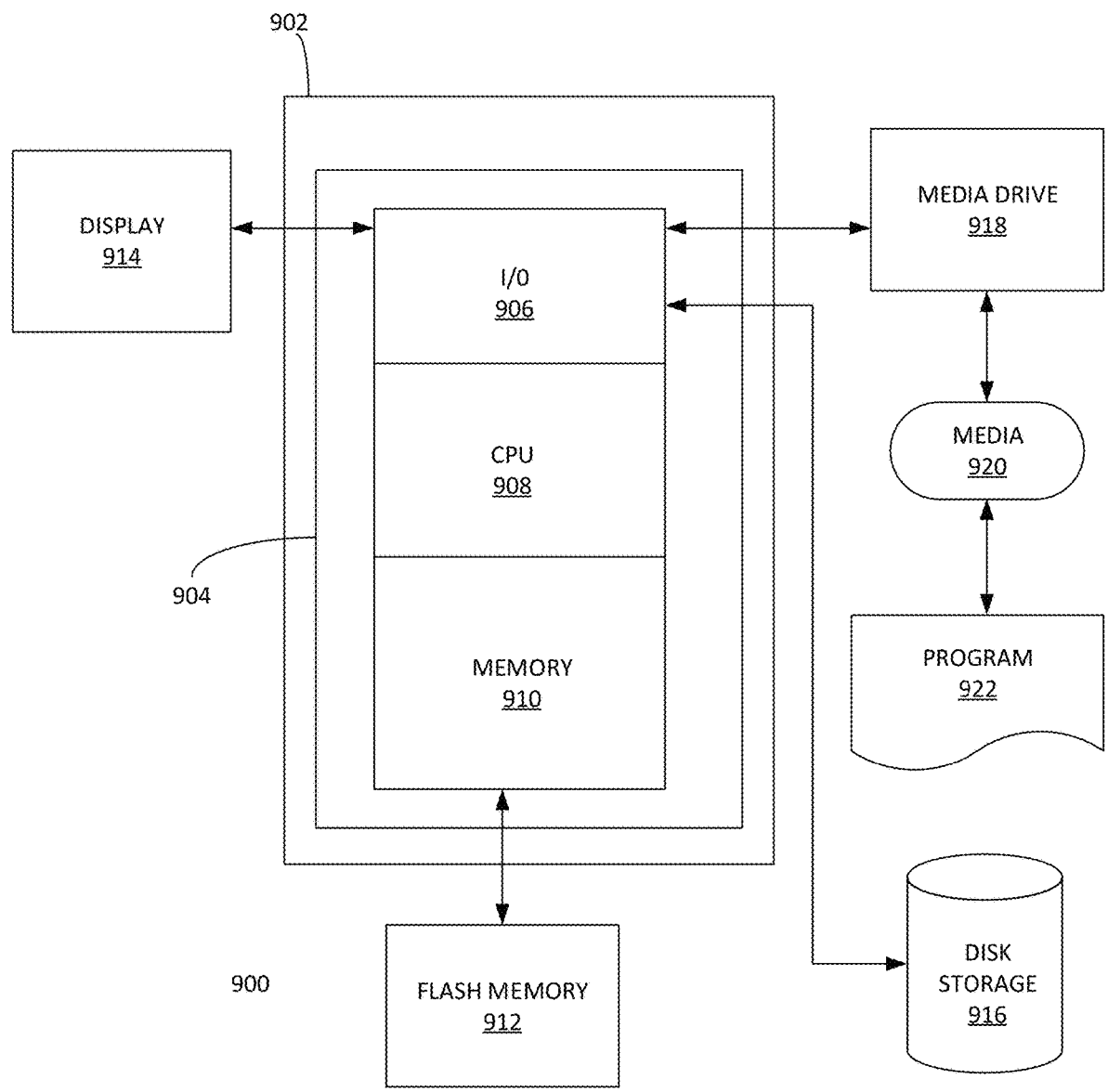
FIG. 9 depicts an exemplary computing system that can be configured to perform any one of the processes provided herein.

FIG. 9 depicts computing system 900 with a number of components that may be used to perform any of the processes described herein. The main system 902 includes a motherboard 904 having an I/O section 906, one or more central processing units (CPU) 908, and a memory section 910, which may have a flash memory card 912 related to it. The I/O section 906 can be connected to a display 914, a keyboard and/or other user input (not shown), a disk storage unit 916, and a media drive unit 918. The media drive unit 918 can read/write a computer-readable medium 920, which can contain programs 922 and/or data. Computing system 900 can include a web browser. Moreover, it is noted that computing system 900 can be configured to include additional systems in order to fulfill various functionalities. Computing system 900 can communicate with other computing devices based on various computer communication protocols such a Wi-Fi, Bluetooth® (and/or other standards for exchanging data over short distances includes those using short-wavelength radio transmissions), USB, Ethernet, cellular, an ultrasonic local area communication protocol, etc.

Figure 10:
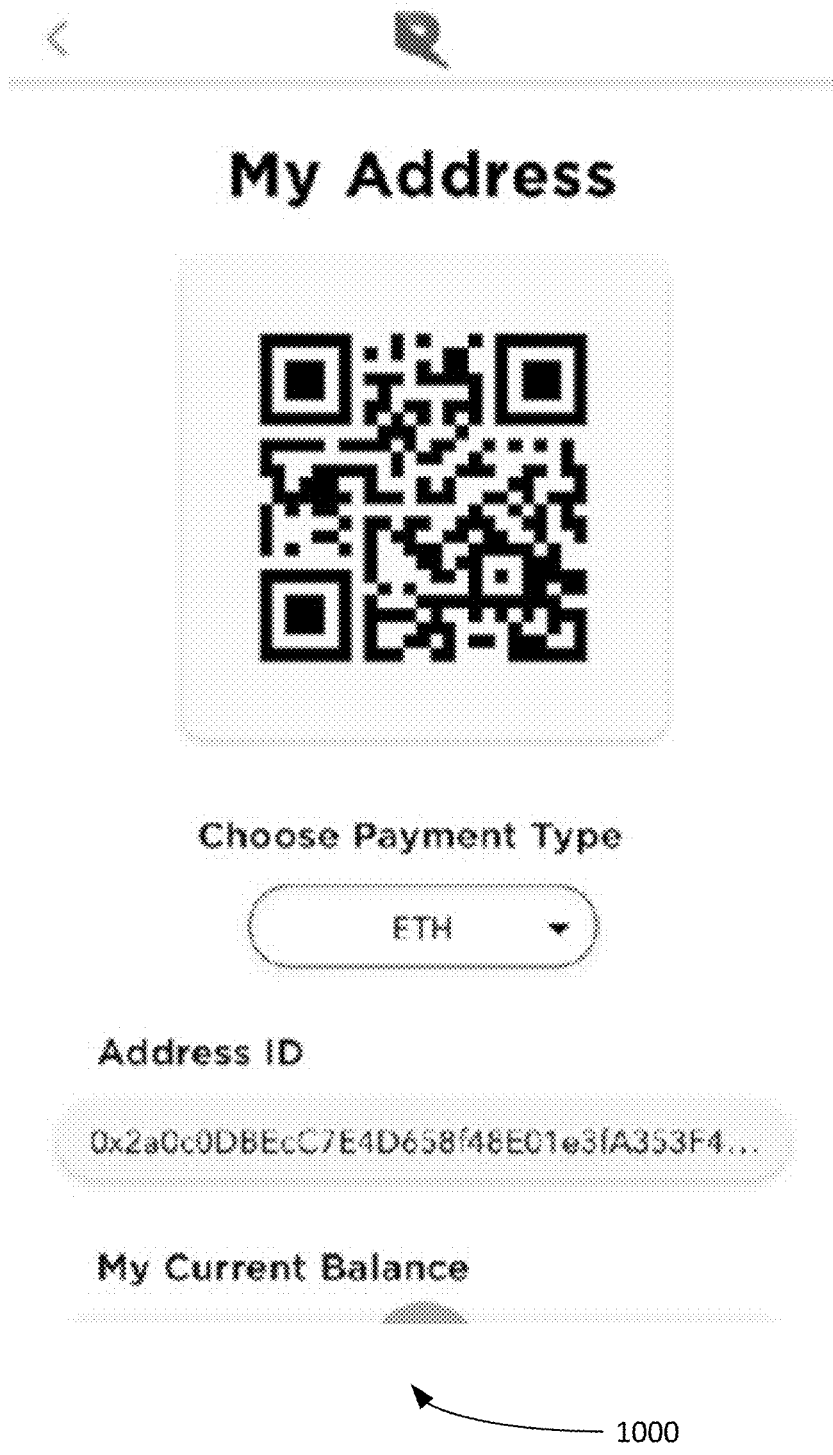
FIG. 10 illustrates an example screenshot of a QR used to transfer ownership, according to some embodiments.

FIG. 10 illustrates an example screenshot 1000 of a QR used to transfer ownership, according to some embodiments. Present methods and systems and use QR codes (and/or other matrix-based codes) to assist users in the transfer of ownership. For example, a first user can scan a QR code of another user and then transfer the ownership of an item to the first user. The information associated with the transfer can be utilized by processes 100-200 and 600. Screenshot 1000 is an example QR code screen.

Figure 11:
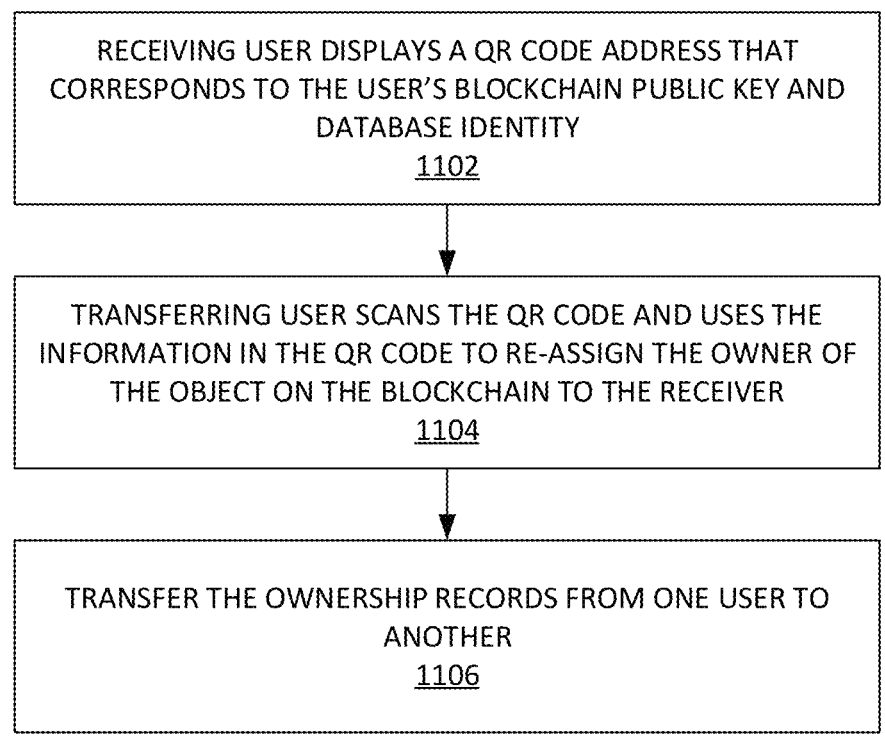
FIG. 11 illustrates another example process for implementing a QR Code transfer, according to some embodiments.

FIG. 11 illustrates another example process 1100 for implementing a QR Code transfer, according to some embodiments. In step 1102, the receiving user displays a QR code address that corresponds to the user's blockchain public key and database identity in the system. For example, this can be a supplementary data in a traditional database.

In step 1104, the transferring user scans the QR code and uses the information in the QR code to re-assign the owner of the object on the blockchain and in the system to the receiver. It is noted that this can also be done without scanning the QR code by entering in the receiver address by hand and then hitting the send button. In step 1106, the process 1100 transfers the ownership records from one user to another. It is noted that process 100 can limit the ability edit or transfer the record to the owner.

It is noted that the holder and the owner can be two different entities. The holder of an object can be an entity who currently possesses it. For example, FIG. 3 supra illustrates an example holder field and owner field. In one example, the holder can be an entity that is holding a package, but the package data on the blockchain can only be altered by the owner (e.g. as the private key holder). In this way, the private key holder is the owner. The private key is maintained in a database associated with the user account. It is noted that, in some examples, the user can download their private key and save it on paper as well. Accordingly, the owner can let someone an item (e.g. a baseball bat) for instance and change the holder to another entity (e.g. 'Ben', etc.). It is also noted that, in one example, a OR code can be used to transfer ownership or possession of a physical object even without a blockchain.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it will be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed as new and desired to be protected by Letters Patent of the United States is:

1. A computerized method for digitally tracking ownership of goods with a blockchain comprising:
   providing the blockchain, wherein the blockchain comprises a set of blockchain ownership records provided in a chronological mathematical proof format such that specified data exists in a specific chronological order;
   saving a smart contract that references a real-world object in the blockchain, wherein the smart contract comprises a tool for tracking ownership of the real-world object, wherein the smart contract comprises a real-world object identifier, and an address data, wherein the smart contract comprises a real-world object holder data, real-world object name data, and a real-world object location data, wherein the smart contract comprises a real-world object description data, wherein the real-world object identifier is a hash of a specified media file, wherein the hash of the specified media file comprises a hash of at least one specified digital photograph of the real-world object that is being tracked in the blockchain, and wherein the blockchain uses a private and public keypair address comprising a private key and a public key to enable a modification of the smart contract, and wherein the tracking of the ownership of the real-world object is saved in the smart contract in the blockchain, and wherein any new values of the real-world object that is being tracked in the blockchain are updated as a string in the smart contract storage on the blockchain;

with a computer application:

enabling an owner of the real-world object to modify an owner data portion of the smart contract to a new owner entity to change the ownership of the real-world object in the blockchain, wherein the owner is defined as a holder of the private key, wherein only the owner holding the private key is allowed to change a property in the smart contract, wherein the property of the smart contract comprises an ownership of the real-world object;

updating the owner data portion of the smart contract in the blockchain to include the new owner entity, wherein the unique ID code comprises a QR code, and wherein the QR code address corresponds to the user's blockchain public key and database identity in the system that is a supplementary data in a traditional database, and wherein a user scans the QR code to fetch history information about the item, wherein the history of the item is fetched in the application, and wherein the history information comprises an ownership history, a plurality of details about the item, and an ability to contact the owner of the item.

2. The computerized method of claim 1, wherein the blockchain comprises an ETHEREUM blockchain.

3. A computer system for automatically for digitally tracking ownership of goods with a blockchain comprising:

a processor;

a memory containing instructions when executed on the processor, causes the processor to perform operations that:

provide the blockchain, wherein the blockchain comprises a set of blockchain ownership records provided in a chronological mathematical proof format such that specified data exists in a specific chronological order;

save a smart contract that references a real-world object in the blockchain, wherein the smart contract comprises a tool for tracking ownership of the real-world object, wherein the smart contract comprises a real-world object identifier, and an address data, wherein the smart contract comprises a real-world object holder data, real-world object name data, and a real-world object location data, wherein the smart contract comprises a real-world object description data, wherein the real-world object identifier is a hash of a specified media file, and wherein the hash of a specified media file comprises a hash of at least one specified digital photograph of the real-world object that is being tracked in the blockchain, and wherein the blockchain uses a private and public keypair address comprising a private key and a public key to enable a modification of the smart contract and wherein any new values of the real-world object that is being tracked in the blockchain are updated as a string in the smart contract storage on the blockchain;

with a computer application:

enable an owner of the real-world object to modify an owner data portion of the smart contract to a new owner entity to change the ownership of the real-world object in the blockchain, wherein the owner is defined as a holder of the private key, wherein only the owner holding the private key is allowed to change a property in the smart contract, wherein the property of the smart contract comprises an ownership of the real-world object, and wherein the tracking of the ownership of the real-world object is saved in the smart contract in the blockchain;

update the owner data portion of the smart contract in the blockchain to include the new owner entity;

generating a matrix code that enables access to the owner data portion of the smart contract a user who scans the matrix code with a user-side mobile device, wherein the unique ID code comprises a QR code, and wherein the QR code address corresponds to the user's blockchain public key and database identity in the system that is a supplementary data in a traditional database, and wherein a user scans the QR code to fetch history information about the item, wherein the history of the item is fetched in the application, and wherein the history information comprises an ownership history, a plurality of details about the item, and an ability to contact the owner of the item.

4. The computerized system of claim 3, wherein the blockchain comprises an ETHEREUM blockchain.

5. The computerized system of claim 3, wherein the matrix code enables access to an ownership chain of the real-world object.

6. The computerized method of claim 5, wherein a display of the ownership chain of the real-world object an item obfuscated a user's real name.

* * * * *